United States Patent [19]
White

[11] Patent Number: 5,551,761
[45] Date of Patent: Sep. 3, 1996

[54] VEHICLE WHEEL AND BRAKE ASSEMBLY WITH ENHANCED CONVECTIVE HEAT TRANSFER

[75] Inventor: Jay D. White, Galesburg, Mich.

[73] Assignee: Eaton Corporation, Cleveland, Ohio

[21] Appl. No.: 352,474

[22] Filed: Dec. 9, 1994

[51] Int. Cl.⁶ ........................................... B60B 19/10
[52] U.S. Cl. ...................... 301/6.3; 301/6.91; 188/264 A
[58] Field of Search ......................... 301/6.1, 6.3, 6.91, 301/6.2; 188/264 A, 264 AA; 244/103 R, 103 S; 192/113.2, 113.23

[56] References Cited

U.S. PATENT DOCUMENTS

| | | | |
|---|---|---|---|
| 2,017,076 | 10/1935 | Sauzedde | 301/6.2 |
| 2,998,870 | 9/1961 | Herman et al. | 188/264 |
| 3,153,557 | 10/1964 | O'Brien | 301/6.3 |
| 3,314,509 | 4/1967 | Peliran | 188/264 AX |
| 3,391,763 | 7/1968 | Severson | 188/218 |
| 3,899,054 | 8/1975 | Huntress et al. | 188/264 AX |
| 4,555,239 | 11/1985 | Miranti, Jr. | 188/264 AX |
| 5,059,170 | 10/1991 | Farr | 301/6 |
| 5,320,201 | 6/1994 | White | 188/264 |

FOREIGN PATENT DOCUMENTS

| | | | |
|---|---|---|---|
| 714997 | 11/1952 | European Pat. Off. | 103/1 |
| 608817 | 2/1935 | Germany | 188/264 |
| 654723 | 6/1951 | United Kingdom | 301/6.2 |
| 2095772 | 10/1982 | United Kingdom | 192/113.1 |

*Primary Examiner*—Russell D. Stormer
*Attorney, Agent, or Firm*—Loren H. Uthoff, Jr.; Howard D. Gordon

[57] ABSTRACT

A vehicle wheel for supporting a tire and attached to a brake drum having a multiplicity of pin-fins extending from a surface of the wheel to increase the surface area available for convective heat transfer into the surrounding airflow thereby increasing the rate of conductive heat transfer from the brake drum for a resultant decrease in the operating temperature of the tire, wheel and brake drum with an attendant increase in performance and service life.

1 Claim, 1 Drawing Sheet

VEHICLE WHEEL AND BRAKE ASSEMBLY WITH ENHANCED CONVECTIVE HEAT TRANSFER

BACKGROUND OF THE INVENTION

1. Field of the Invention

The present invention relates to a vehicle wheel. More specifically, the present invention relates to a vehicle wheel having enhanced thermal qualities that result in lower operating temperatures.

2. Description of the Prior Art

In order to brake a vehicle such as an automobile or truck moving horizontally, the kinetic energy of the entire mass of the vehicle must be converted to heat. There is some energy conversion by aerodynamic drag on the vehicle, engine compression, fluid temperature in the transmission and rolling friction of the wheels relative to the road surface, for example. However, the primary mechanism of conversion of this energy to heat is the vehicle brake system. Heat generation rates vary greatly in vehicle brake systems and adequate provision must be made for the dissipation of high heat loads in a short period of time.

When drum brakes are used, the heat is removed from interfacial sliding surfaces. These surfaces may include the brake drum as well as the brake shoes. The brake drum is a fairly massive heat sink, is engaged throughout a relatively large arcuate portion of its internal cylindrical braking surface by the brake shoes, and has the outer surface cooled by convection currents of air. The brake pad shoes have little or no heat sink capability so that most of the heat generated by braking passes directly into the drum. Power input into the drums can heat the internal surface metal of the drum to high temperatures in the 1000° F. range. Much of the heat in the drum is temporarily stored in the surface layer of the metal, and is transferred toward the drum outer surface. The temperature gradient decreases toward the outer surface and heat flows into the wheel(s) and to the air until the drum is cool. This often takes an extended period of time, and drums, wheels and tires may be heated beyond the desired level under severe conditions of repeated heavy braking.

The problem of removal of heat has been attacked by providing heat sinks, air cooling, and liquid cooling. A variety of airflow enhancement devices and designs have been applied to the wheel and brake drum to lower the system operating temperature. British Patent No. 714,997, published Sep. 8, 1954 and U.S. Pat. Nos. 5,320,201; 4,135,764; 2,998,870; and 2,059,170 illustrate the types of devices employed to date in an attempt to lower the temperature of the various brake and wheel system components.

Heat conducted from a vehicle brake drum into the wheel can be a significant factor in the reduction in service life of a tire. Under severe braking events or a sequence of events, the brake system and wheel components can reach elevated temperatures. Heating of the tire can result in chemical changes that cause a breakdown in the structure of the tire. Thus, the temperature of the wheel, especially where the tire contacts the wheel, is important when considering the life expectancy of the tire/wheel/brake system.

SUMMARY OF THE INVENTION

A vehicle wheel and brake assembly is disclosed which exhibits an increase in the convective heat transfer coefficient due to the attachment of a multiplicity of pin-fins to selected portions of the vehicle wheel which lowers the wheel temperature especially at the tire bead. The pin-fins function to increase convective heat transfer by increasing the effective surface area of the wheel available for convective heat transfer into the surrounding airstream which not only lowers the wheel temperature, but also the brake drum temperature for improved performance and life.

Pin-fins are relatively small formations of material formed on a surface, such as a vehicle wheel, which extend into the surrounding air thereby utilizing conduction to lower the wheel temperature by transferring heat into the pin-fins from the wheel and then using convection to transfer heat into the surrounding air thereby significantly lowering the temperature of the wheel for a given heat load from the brake drum.

A provision of the present invention is to lower the operating temperature of a vehicle wheel by increasing the rate of convective heat transfer using a multiplicity of pin-fins.

Another provision of the present invention is to lower the operating temperature of a vehicle wheel by increasing the rate of conductive heat transfer and convective heat transfer.

Still another provision of the present invention is to lower the operating temperature of a vehicle wheel by increasing the rate of conductive and convective heat transfer utilizing a multiplicity of pin-fins formed on the outer surface of the wheels.

DETAILED DESCRIPTION OF THE PREFERRED EMBODIMENT

Figure 1:
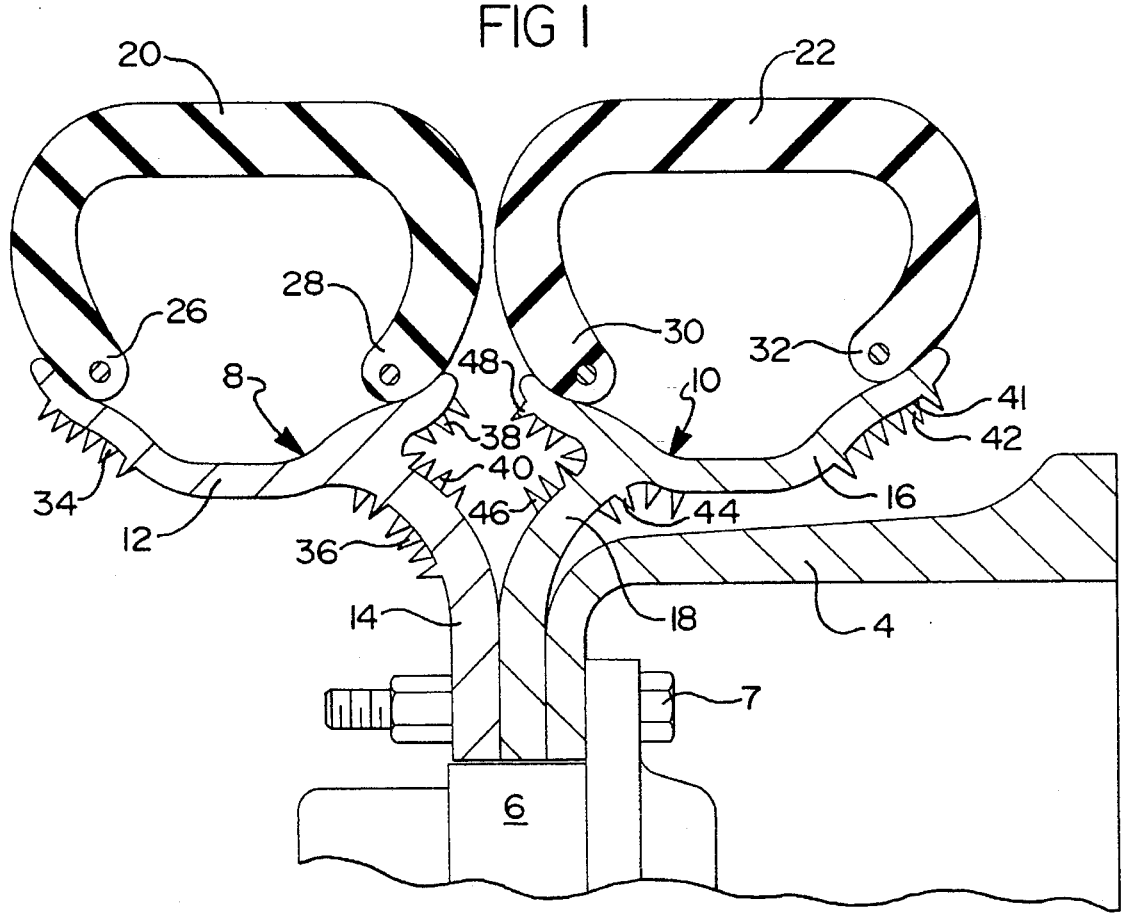
FIG. 1 is a partial cross-sectional view of a pair of wheels of the present invention mounted to a brake drum.

In this disclosure, certain terminology will be used for convenience and reference only and will not be limiting. For example, the terms "rightward" and "leftward" will refer to directions in the drawings connection with which the terminology is used. The terms "inwardly" and "outwardly" will refer to directions toward and away from, respectively, the geometric center of the apparatus being described. The terms "upward" and "downward" refer to directions as taken in the drawings connection with which the terminology is used. All foregoing terms include normal derivatives and equivalents thereof.

Now referring to FIG. 1, a partial cross-sectional view of a pair of wheels 8, 10 of the present invention mounted to a brake drum 4 and a wheel hub 6 is shown. The wheels 8 and 10 are commonly bolted to the brake drum 4 and wheel hub 6 using a fastening device 7. The wheels 8 and 10 are shown as that configuration commonly used on trucks for drive or trailer axles. However, the present invention could be applied to only one wheel mounted on a steer axle or any other type of axle such as a drive axle.

The inner wheel 8 is comprised of a rim section 12 attached to a flange section 14 which is bolted to the wheel hub 6 and supports the rim section 12. Likewise, the outer wheel 10 is comprised of a rim section 16 attached to a flange section 18 which is bolted to the wheel hub 6 and supports the rim section 16. Tire 20 is supported on rim 12 at bead sections 26 and 28 and likewise tire 22 is supported on rim 16 at bead sections 30 and 32.

Heat generated at the brake drum 4 travels into the wheels 8 and 10 which results in high temperatures at the bead sections 26, 28, 30 and 32. To reduce these temperatures, pin-fins 34, 36, 38, 40, 42, 44, 46 and 48 have been formed on surfaces of the wheels 8 and 10 respectively to effectively increase the surface area of the wheels 8 and 10 to increase the rate of convective heat transfer into the surrounding air prior to conduction into the tire bead sections 26, 28, 30 and 32. In this manner, the wheels 8 and 10 of the present invention reduce the operating temperature of the tires 20 and 22 respectively thereby improving the service life of the tires 20 and 22 especially when under extreme braking duty cycles.

On wheel 8, pin-fins 34, 36, 38 and 40 have been formed both on the rim 12 and on both sides of the flange section 14 for example, pin-fin 42 has base 41 attached to the wheel 10 and has a height approximately twice the width of the base 41 to maximize the conductive and convective heat flow out of the rim section 16. Likewise on wheel 10, pin-fins 42, 44, 46 and 48 have been formed on the rim 16 and the flange section 18. The pin-fins 34, 36, 38, 40, 42, 44, 46 and 48 extend around the circumference of the wheels 8 and 10 respectively in either a uniform repeating pattern or in a random pattern so as to optimize the airflow pattern over the outer surface of the wheels 8 and 10 so as to maximize the convective heat flow. Any number of variances in patterns, sizes, spacing, heights and shapes of the pin-fins 34, 36, 38, 40, 42, 44, 46 and 48 are contemplated and fall under the disclosure of the present invention. For example, the pin-fins 34 could extend higher and be placed in a different pattern than the other pin-fins 36, 38 and 40 to optimize airflow over the outside of the rim 12, or various heights of pin-fins could be used to increase heat transfer into the surrounding airflow.

Figure 2:
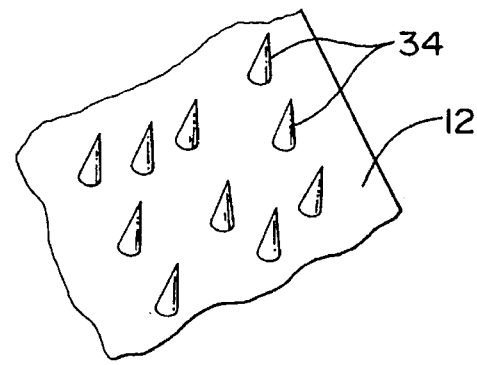
FIG. 2 is a plan view of a portion of the wheel of the present invention.

Now referring to FIG. 2, a perspective view of a plurality of pin-fins 34 formed on a portion of the rim section 12 of the present invention is shown. The pin-fins 34 are most easily formed in the surface of the wheel 20 when the wheel 20 is fabricated such as by casting especially when the wheel 20 is made of aluminum. The placement of the pin-fins 34 on the surface of the wheel 20 can be symmetrical to form a repeating pattern or a random placement can be used to generate the desired airflow patterns over the surface of the wheel 8. For example, the pin-fins 34 can be arranged in aligned groups spaced circumferentially around the wheel 20 or in the alternative, radially aligned along a line running from the rotational axis of the wheel 20 radially outward. Also, the pin-fins 34 can be a variety of shapes such as square, pyramid or rounded knobs in addition to that disclosed in the drawings.

It will be appreciated by those of ordinary skill in the art that many variations in the foregoing preferred embodiments are possible while remaining within the scope of the present invention. The present invention should thus not be considered limited to the preferred embodiments or the specific choices of materials, configurations, dimensions, applications or ranges of parameters employed therein, but only by the claims as herein follows.

I claim:

1. A vehicle wheel comprising:

a rim for supporting a tire;

a flange attached to said rim for mounting to a vehicle wheel hub;

a multiplicity of pin fins formed on a surface of said rim and on a surface of said flange for increasing the rate of convective heat transfer;

said pin fins having a conical cross sectional shape, each of said pin fins having a base mounted to said wheel, said pin fins extending outward a distance of approximately twice the width of said base, and arranged in a random pattern on said wheel to promote random airflow over said wheel.

* * * * *